(12) United States Patent
Teranishi et al.

(10) Patent No.: US 11,040,345 B2
(45) Date of Patent: Jun. 22, 2021

(54) MICROFLUIDIC DEVICE

(71) Applicant: Sharp Life Science (EU) Limited, Oxford (GB)

(72) Inventors: Tomoko Teranishi, Osaka (JP); Yunting Shen, Osaka (JP); Hao Li, Osaka (JP)

(73) Assignee: Sharp Life Science (EU) Limited, Oxford (GB)

( * ) Notice: Subject to any disclaimer, the term of this patent is extended or adjusted under 35 U.S.C. 154(b) by 415 days.

(21) Appl. No.: 16/088,645

(22) PCT Filed: Mar. 23, 2017

(86) PCT No.: PCT/JP2017/011585
§ 371 (c)(1),
(2) Date: Feb. 25, 2019

(87) PCT Pub. No.: WO2017/170075
PCT Pub. Date: Oct. 5, 2017

(65) Prior Publication Data
US 2019/0193074 A1 Jun. 27, 2019

(30) Foreign Application Priority Data
Mar. 30, 2016 (JP) .............................. JP2016-067101

(51) Int. Cl.
*B01L 3/00* (2006.01)
*B01J 19/00* (2006.01)

(52) U.S. Cl.
CPC .......... *B01L 3/50273* (2013.01); *B01J 19/00* (2013.01); *B01L 3/502715* (2013.01); *B01L 3/502792* (2013.01); *B01L 2200/027* (2013.01); *B01L 2200/0689* (2013.01); *B01L 2300/0861* (2013.01); *B01L 2300/161* (2013.01); *B01L 2400/0427* (2013.01)

(58) Field of Classification Search
CPC .......... B01L 3/50273; B01L 3/502792; B01L 3/502715; B01L 2200/0689;
(Continued)

(56) References Cited

U.S. PATENT DOCUMENTS

| 5,639,428 A | 6/1997 | Cottingham |
| 2002/0036142 A1* | 3/2002 | Gascoyne ............... B03C 5/028 |
| | | 204/547 |

(Continued)

FOREIGN PATENT DOCUMENTS

| CN | 101971013 A | 2/2011 |
| EP | 0693560 | 1/1996 |

(Continued)

OTHER PUBLICATIONS

Translation of JP 2007-267635 A, Inventors: Isoda, Takasato et al, (Year: 2007).*

(Continued)

*Primary Examiner* — Jennifer Wecker
*Assistant Examiner* — Jonathan Bortoli
(74) *Attorney, Agent, or Firm* — Renner, Otto, Boisselle & Sklar, LLP

(57) ABSTRACT

An embodiment of the present invention provides a microfluidic device into which fluid can be more easily introduced. A microfluidic device (1) is configured such that: (i) an upper substrate (2) is bonded to a lower substrate (6) via a sealing pattern (5) in such a manner that at least a portion of an edge of the upper substrate (2) is located inward of an edge of the lower substrate (6); and (ii) the sealing pattern (5) includes at least one gap (12) that is provided at a position where the edge of the upper substrate (2) is located inward of the edge of the lower substrate (6).

9 Claims, 10 Drawing Sheets

(58) Field of Classification Search
CPC ....... B01L 2400/0427; B01L 2200/027; B01L 2300/0861; B01L 2300/161; B01J 19/00
See application file for complete search history.

(56) References Cited

U.S. PATENT DOCUMENTS

| | | | | |
|---|---|---|---|---|
| 2007/0110613 | A1* | 5/2007 | Paehl | ................ B01L 3/502707 422/400 |
| 2008/0185296 | A1 | 8/2008 | Sauter-Starace et al. | |
| 2010/0213070 | A1 | 8/2010 | Oki et al. | |
| 2010/0282608 | A1 | 11/2010 | Srinivasan et al. | |
| 2011/0034348 | A1 | 2/2011 | Deutsch et al. | |
| 2013/0161193 | A1* | 6/2013 | Jacobs | .............. B01L 3/502792 204/604 |

FOREIGN PATENT DOCUMENTS

| | | | |
|---|---|---|---|
| EP | 2 214 015 | B1 * | 2/2011 ............. G01N 33/53 |
| EP | 2606975 | | 6/2013 |
| EP | 3435150 | A1 | 1/2019 |
| FR | 2889081 | A1 | 2/2007 |
| JP | H862225 | | 3/1996 |
| JP | 2004-532968 | | 10/2004 |
| JP | 2006-509187 | | 3/2006 |
| JP | 2007-267635 | | 10/2007 |
| JP | 2009-72083 | | 4/2008 |
| JP | 2013-128920 | | 7/2013 |
| WO | WO 2004/034053 | A2 | 4/2004 |
| WO | WO 2005/054845 | A1 | 6/2005 |
| WO | WO 2007/12637 | A1 | 2/2007 |
| WO | WO 2010/023848 | A1 | 3/2010 |
| WO | WO 2013/179835 | A1 | 12/2013 |

OTHER PUBLICATIONS

Translation of JP 2004-233590 A, Inventors:Matsumoto, Yasushi et al, (Year: 2004).*
International Search Report and Written Opinion for corresponding International Application No. PCT/JP2017/0111585, dated May 30, 2017.

* cited by examiner

MICROFLUIDIC DEVICE

RELATED APPLICATIONS

This application is a national phase of International Patent Application Serial No. PCT/JP2017/011585, filed on Sep. 23, 2017 which claims priority to JP Application No. 2016067101 filed on Mar. 30, 2016, the entire disclosures of which are hereby incorporated by reference.

TECHNICAL FIELD

The present invention relates to a microfluidic device containing fluid introduced therein.

BACKGROUND ART

Into a microfluidic device to which an active matrix electrowetting on dielectric (AM-EWOD) technique is applied, in general, an upper substrate is provided with a small hole(s) for introduction of fluid such as oil or liquid droplets. Then, the fluid is introduced with use of a pipette or the like through the hole(s) into the microfluidic device.

The position and the size of the small hole(s) provided in the upper substrate depend on the pitch of electrodes in an active area and very high accuracy of the position and very high precision of the size are required. Meanwhile, in a case where the upper substrate is a glass substrate, it is required to prevent as much as possible a microcrack(s) from being produced at a hole wall(s) and in the vicinity of the hole(s) during hole making. This is intended to ensure the strength of the substrate and to prevent contamination of the fluid channel.

An example of a hole making technique that satisfies the above conditions include (i) a precise drilling technique, an etching technique, and the like in the case of a glass substrate, and (ii) a high-precision metal mold casting process and the like in the case of a plastic substrate. However, the technical difficulty level of any of these techniques is high. Accordingly, the cost of the upper substrate is prominently higher than the other members constituting the microfluidic device. In addition, the number of holes that can be provided is limited.

In light of the above, Patent Literature 1 discloses a technique according to which fluid is introduced without making holes. In a microfluidic device disclosed in Patent Literature 1, a frame is provided so as to surround the periphery of an upper substrate. The frame is provided with one or more openings, each of which forms a fluid channel extending to a position between the upper substrate and a lower substrate from outside the microfluidic device. Through the one or more openings, the fluid can be introduced between the upper substrate and the lower substrate (into a cell).

CITATION LIST

Patent Literature

[Patent Literature 1] US Patent Application Publication No. 2010/0282608 (Nov. 11, 2010)

SUMMARY OF INVENTION

Technical Problem

However, in the microfluidic device disclosed in Patent Literature 1, it is necessary to separately provide a frame that has an opening for introducing fluid into a cell. Accordingly, there is a demand for a microfluidic device that allows for easier introduction of fluid into a cell.

In view of the above problem, the present invention has been attained. An object of the present invention is to provide a microfluidic device that allows for easier introduction of fluid into a cell.

Solution to Problem

In order to solve the above problem, a microfluidic device in accordance with an aspect of the present invention is a microfluidic device containing fluid introduced therein, the microfluidic device including: a lower substrate on which a lower water-repellent pattern is formed; an upper substrate on which an upper water-repellent pattern is formed, the upper substrate being provided such that at least a portion of an edge of the upper substrate is located inward of an edge of the lower substrate; and a sealing pattern (or "seal pattern") for bonding the upper substrate and the lower substrate, the sealing pattern including at least one gap that is provided at a position where the edge of the upper substrate is located inward of the edge of the lower substrate.

Advantageous Effects of Invention

An aspect of the present invention makes it possible to more easily introduce fluid into a cell.

Figure 2:
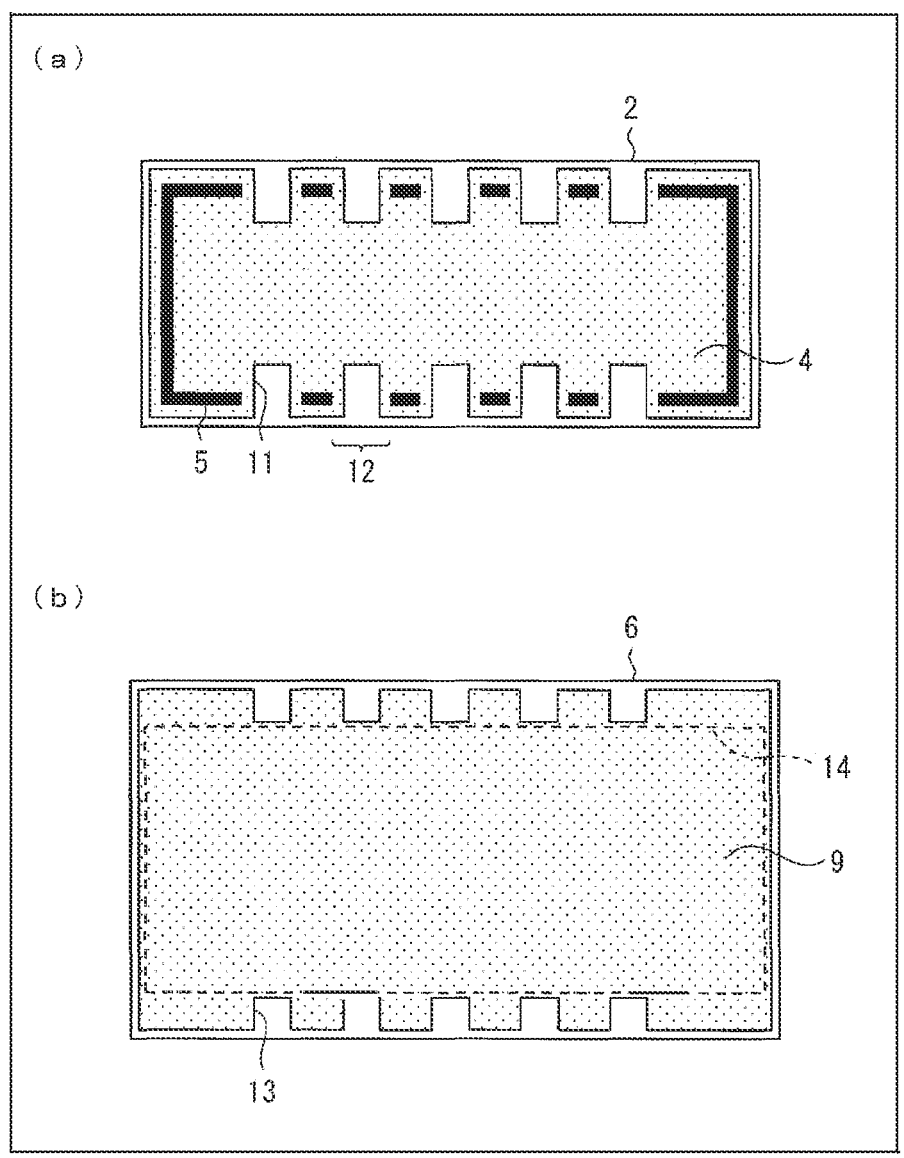

(a) of FIG. 2 is a top view of an upper substrate and (b) of FIG. 2 is a top view of a lower substrate.

Figure 3:
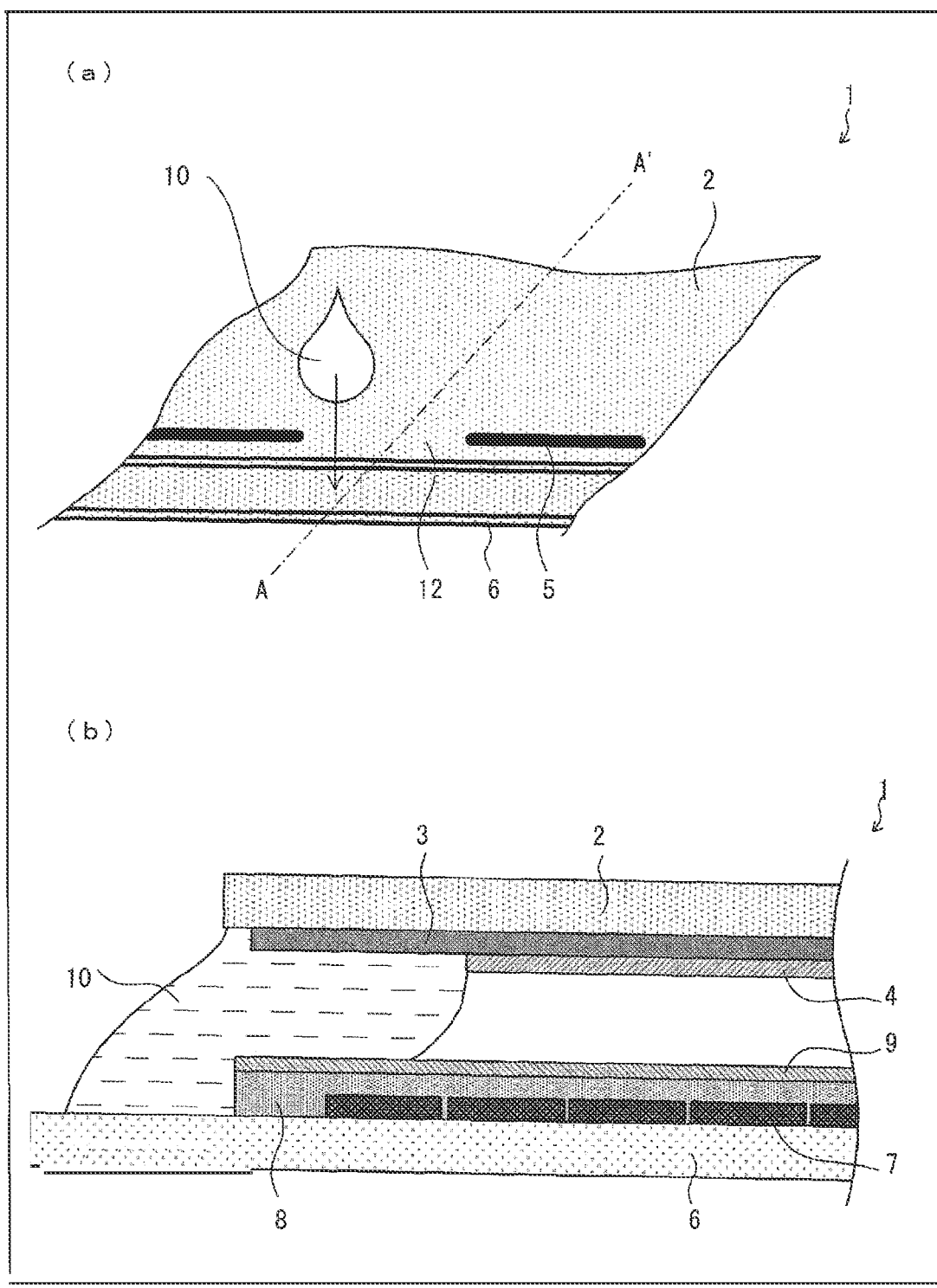

(a) of FIG. 3 is a partial perspective view of a microfluidic device at the time when fluid is introduced into the microfluidic device, and (b) of FIG. 3 is cross-sectional view taken along the line A-A' in (a) of FIG. 3.

Figure 4:
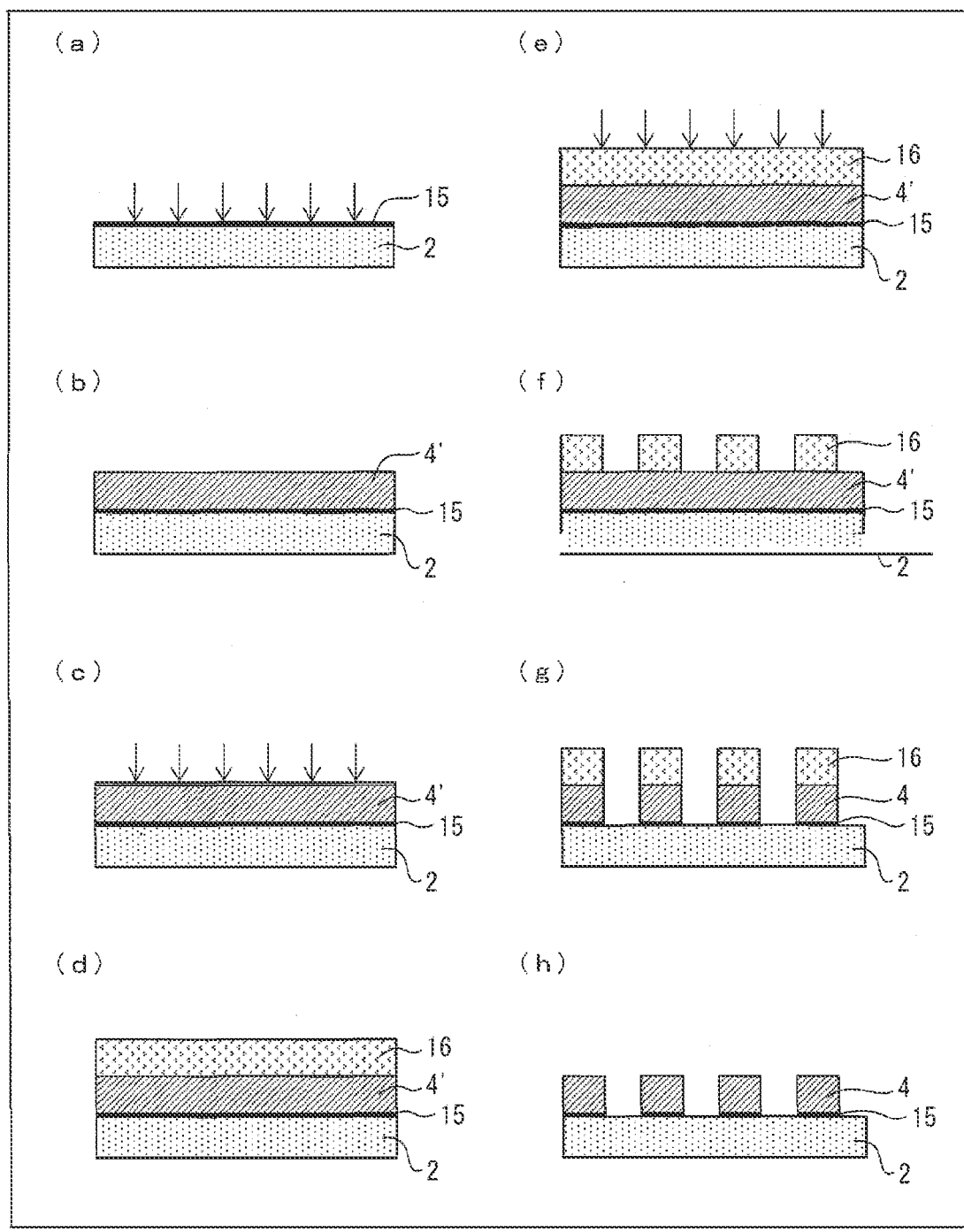

(a) to (h) of FIG. 4 are views illustrating respective steps of forming an upper water-repellent pattern on an upper substrate.

Figure 5:
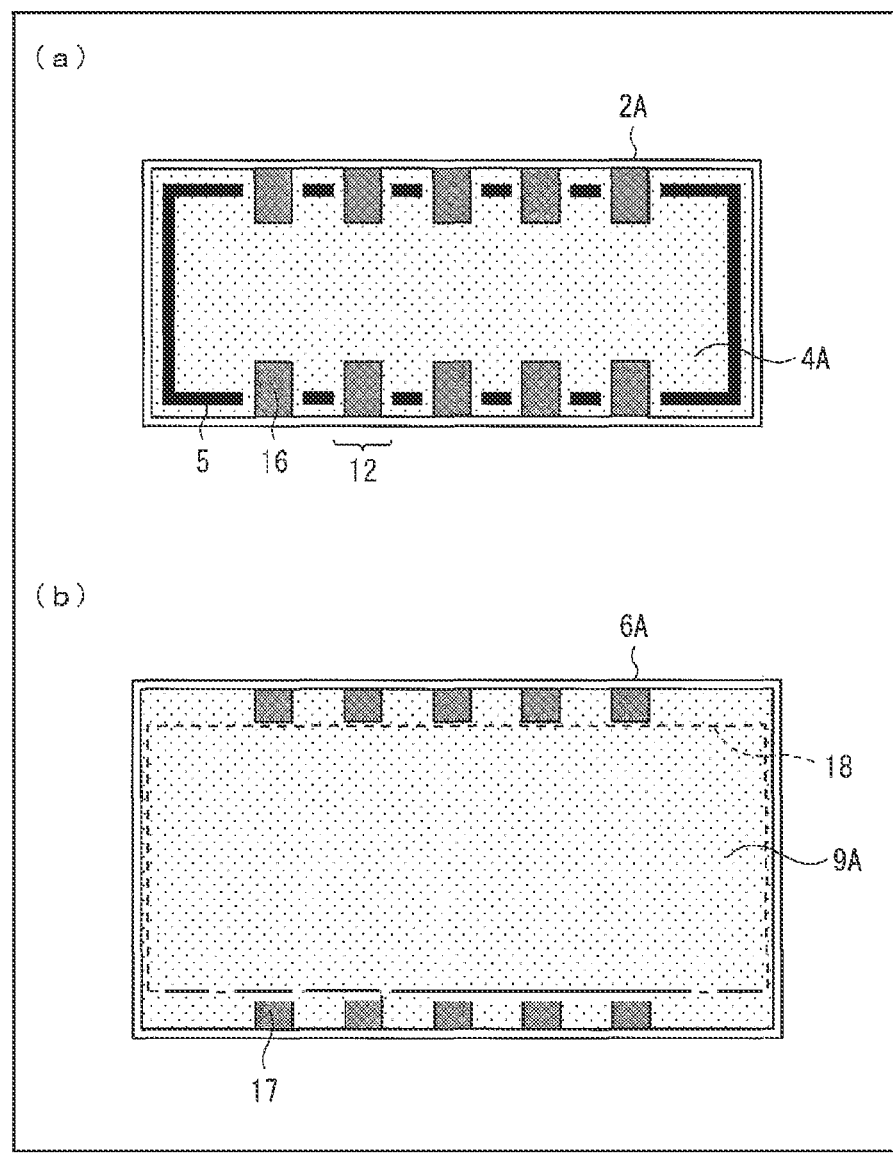

(a) of FIG. 5 is a top view of an upper substrate and (b) of FIG. 5 is a top view of a lower substrate.

Figure 6:
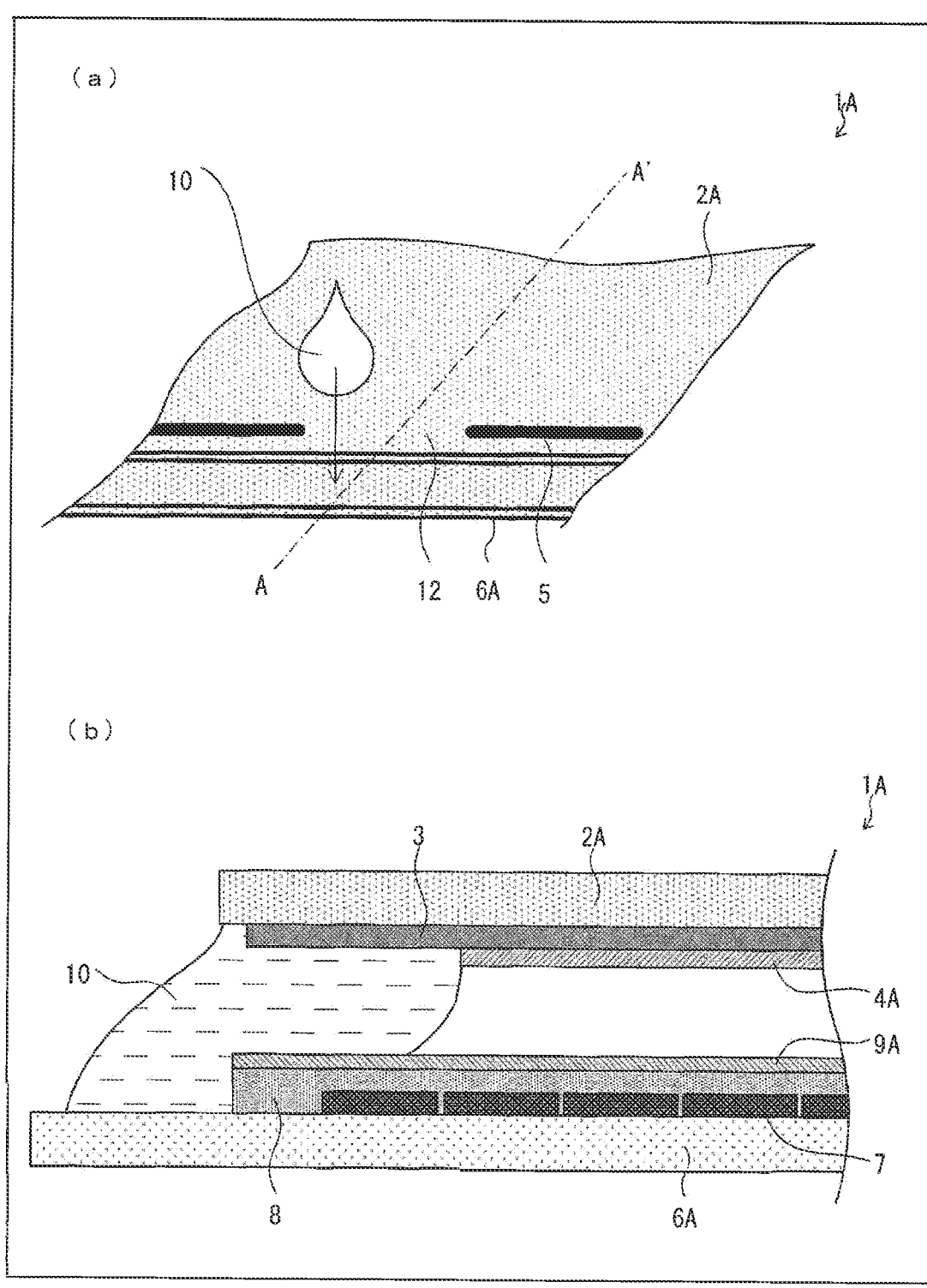

(a) of FIG. 6 is a partial perspective view of a microfluidic device at the time when fluid is introduced into the microfluidic device, and (b) of FIG. 6 is cross-sectional view taken along the line A-A' in (a) of FIG. 6.

Figure 7:
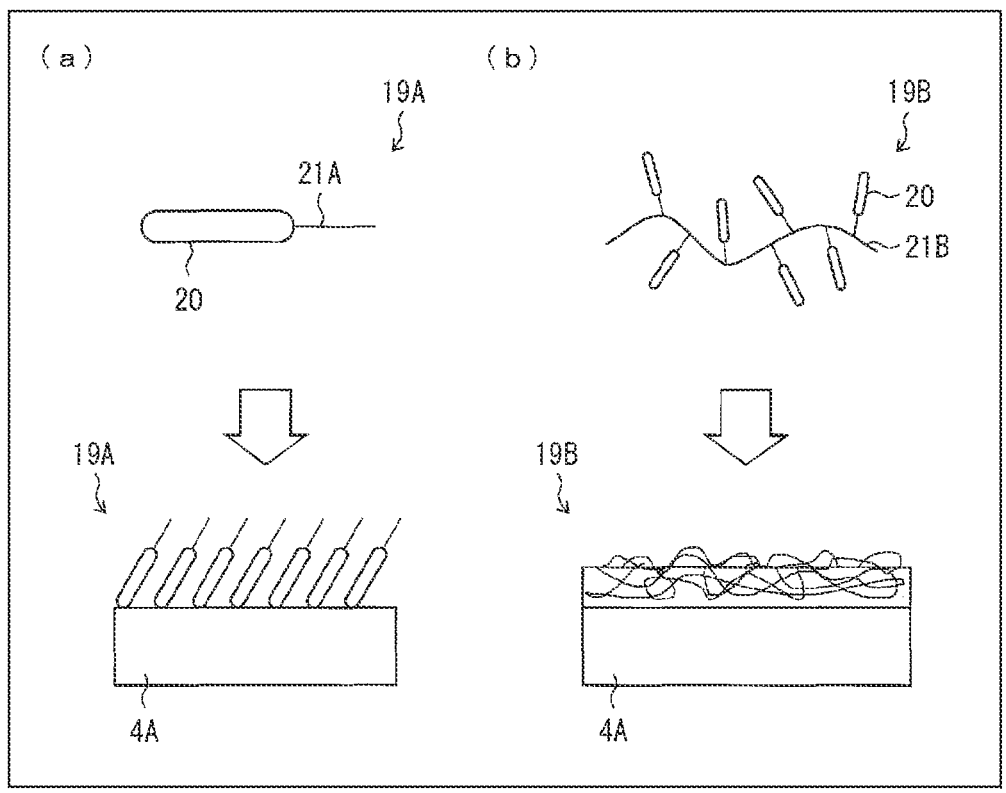

(a) of FIG. 7 is a view illustrating a method of forming a hydrophilic pattern with use of a monomolecular hydrophilic material, and (b) of FIG. 7 is a view illustrating a method of forming a hydrophilic pattern with use of a polymeric hydrophilic material.

Figure 8:
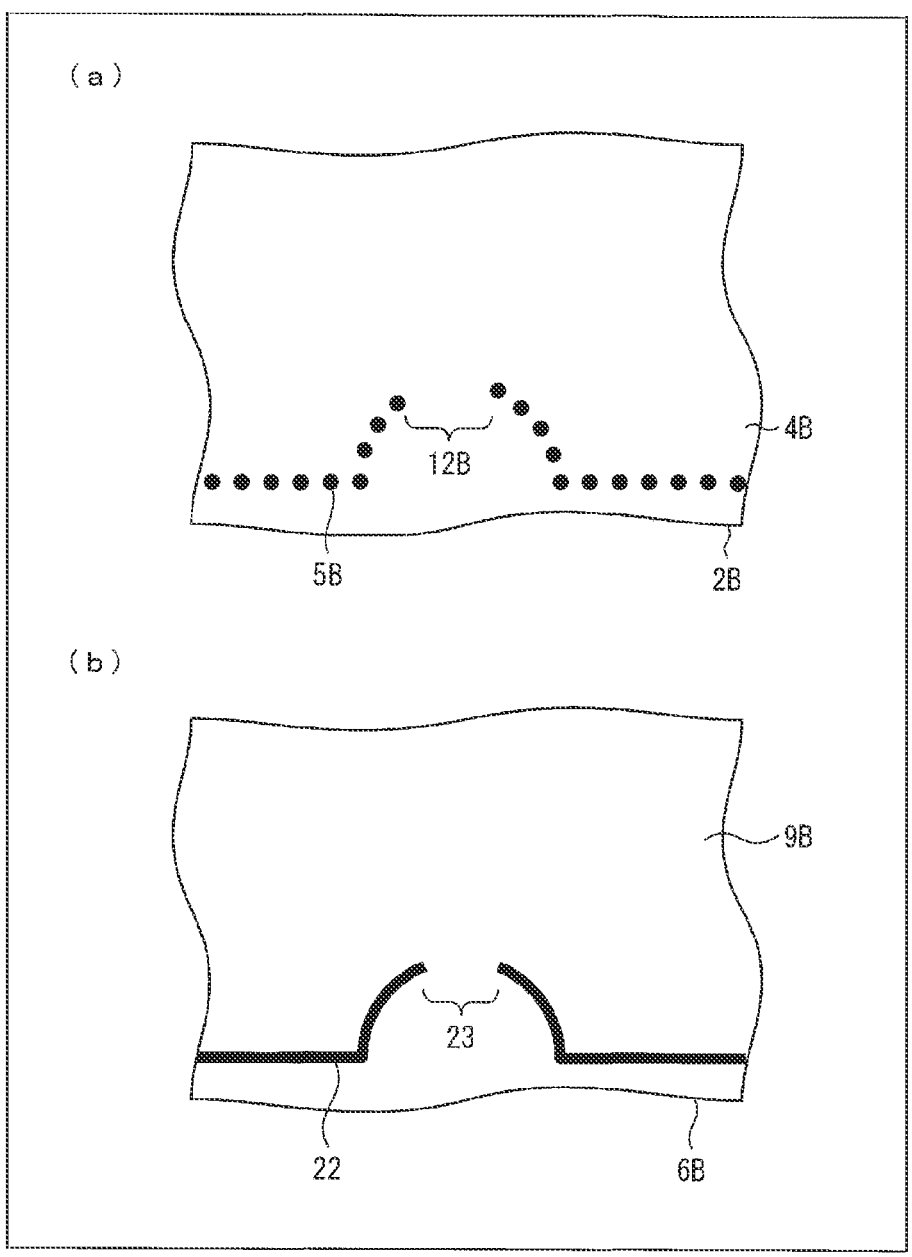

(a) of FIG. 8 is a partial top view of an upper substrate and (b) of FIG. 8 is a partial top view of a lower substrate.

Figure 9:
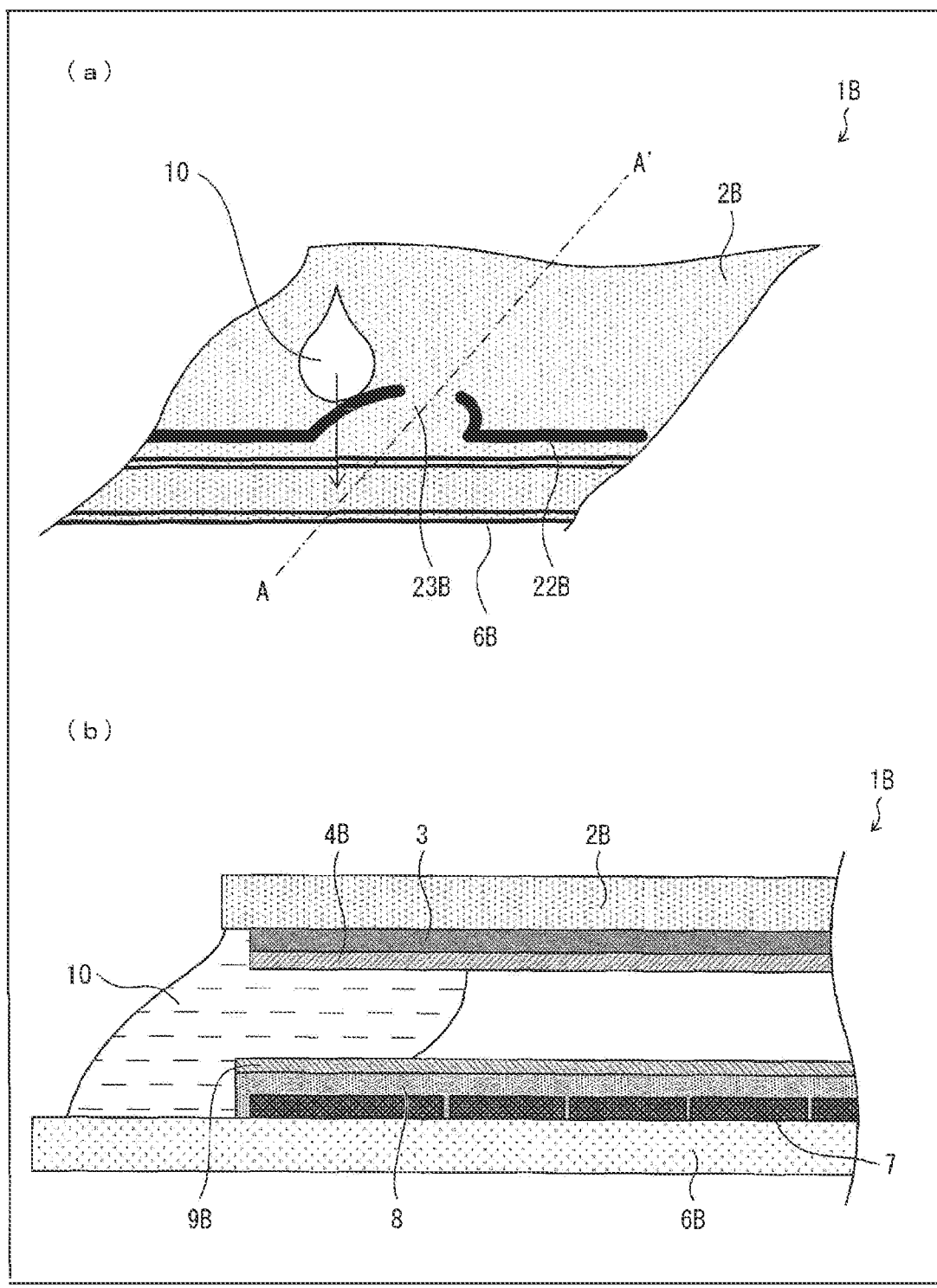

(a) of FIG. 9 is a partial perspective view of a microfluidic device at the time when fluid is introduced into the microfluidic device, and (b) of FIG. 9 is cross-sectional view taken along the line A-A' in (a) of FIG. 9.

Figure 10:
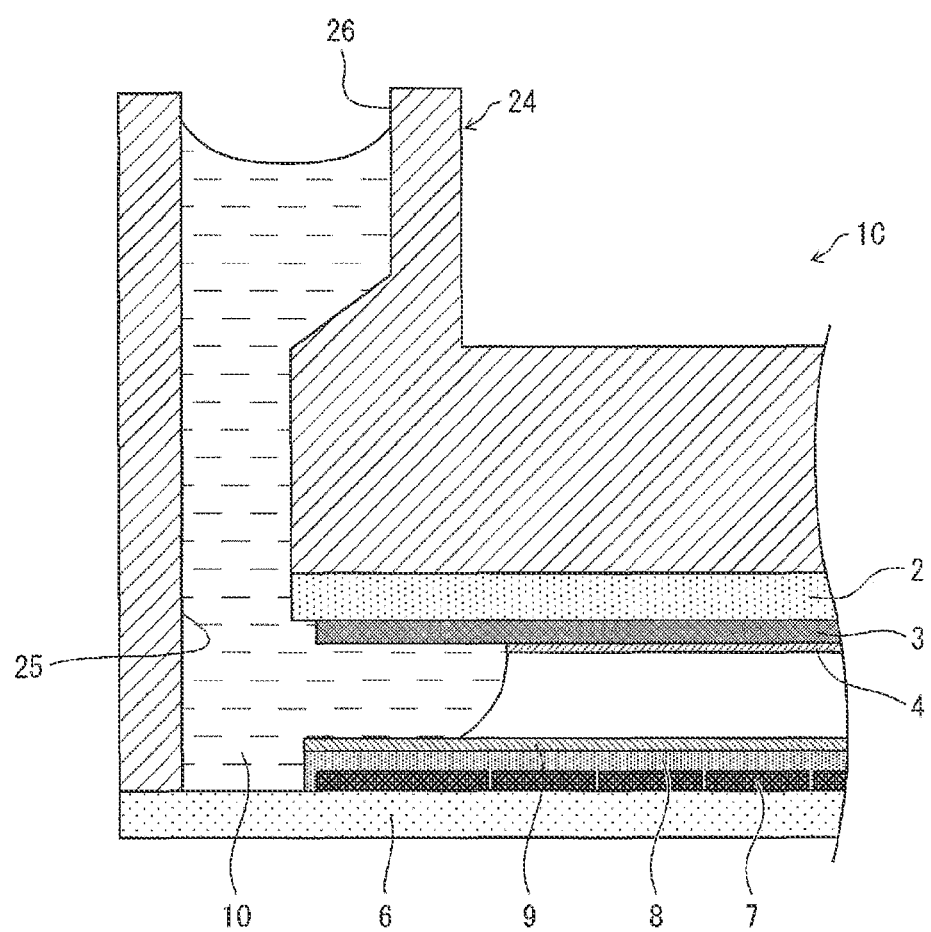

FIG. 10 is a partial cross-sectional view of a microfluidic device in a case where fluid is introduced into the microfluidic device.

DESCRIPTION OF EMBODIMENTS

Embodiment 1

The following will discuss Embodiment 1 of the present invention, with reference to FIGS. 1 to 4.

Microfluidic Device

Figure 1:
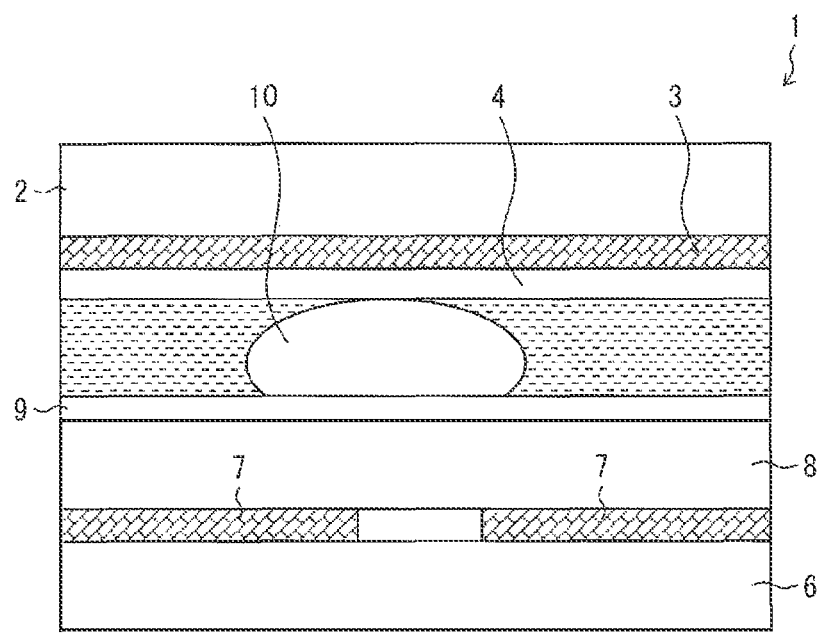
FIG. 1 is a cross-sectional view of a microfluidic device in accordance with an embodiment of the present invention.

The following will discuss a microfluidic device in accordance with Embodiment 1, with reference to FIG. 1. FIG. 1 is a cross-sectional view of a microfluidic device 1 in accordance with Embodiment 1.

As illustrating in FIG. 1, the microfluidic device 1 includes a pair of substrates including an upper substrate 2 and a lower substrate 6. On the upper substrate 2, an upper electrode 3 is formed. Further, on the upper electrode 3, an upper water-repellent pattern 4 is formed. Meanwhile, on the lower substrate 6, a plurality of lower electrodes 7 is formed. Further, on the lower electrodes 7, a dielectric layer 8 is formed. In addition, on the dielectric layer 8, a lower water-repellent pattern 9 is formed.

The upper substrate 2 and the lower substrate 6 are bonded to each other via a sealing pattern so as to form a cell. The sealing pattern is provided along a peripheral portion of at least one of the upper substrate 2 and the lower substrate 6. The sealing pattern will be discussed later. The cell contains fluid 10 such as oil or liquid droplets introduced therein. When voltage is applied to the lower electrodes 7, the fluid 10 thus introduced is deformed and displaced (moved) within the cell due to an electrowetting effect. Specifically how the fluid 10 is introduced will be discussed later.

Fluid Introduction Structure

In the microfluidic device 1 in accordance with Embodiment 1, a structure for introduction of the fluid 10 into the cell is provided on the upper substrate 2. The following will discuss the structure, with reference to FIGS. 2 and 3. (a) of FIG. 2 is a top view of the upper substrate 2 and (b) of FIG. 2 is a top view of the lower substrate 6. (a) of FIG. 3 is a partial perspective view of the microfluidic device 1 at the time when the fluid 10 is introduced into the microfluidic device 1, and (b) of FIG. 3 is cross-sectional view taken along the line A-A' in (a) of FIG. 3.

As illustrated in (a) of FIG. 2, the upper substrate 2 is provided with a sealing pattern 5 formed on the upper water-repellent pattern 4. The upper substrate 2 is bonded via the sealing pattern 5 to a surface of the lower substrate 6 which surface is on a lower water-repellent pattern 9 side of the lower substrate 6. As illustrated in (b) of FIG. 2, the lower substrate 6 is larger than the upper substrate 2, and the upper substrate 2 is bonded to the lower substrate 6 such that the upper substrate 2 is within the surface of the lower substrate 6 (an area 14 in (b) of FIG. 2). In other words, the upper substrate 2 is bonded to the lower substrate 6 via the sealing pattern 5 such that at least a portion of an edge of the upper substrate 2 is located inward of an edge of the lower substrate 6. Note that the sealing pattern 5 may be formed on the lower water-repellent pattern 9 of the lower substrate 6.

At the portion where the edge of the upper substrate 2 is located inward of the edge of the lower substrate 6, the sealing pattern 5 is provided with at least one gap 12. In (a) of FIG. 2, the sealing pattern 5 is in the shape of a straight line, and the gap 12 is provided at portions of the sealing pattern 5.

As illustrated in (a) of FIG. 3, the fluid 10 to be introduced into the microfluidic device 1 is dropped on the lower substrate 6 in the vicinity of the gap 12 in the sealing pattern 5. Then, the fluid 10 thus dropped naturally enters between the upper substrate 2 and the lower substrate 6 through the gap 12 in the sealing pattern 5 due to capillary action, as illustrated in (b) of FIG. 3. In this way, in the microfluidic device 1 in accordance with Embodiment 1, the fluid 10 can be introduced into the cell of the microfluidic device 1.

In the microfluidic device 1 in accordance with Embodiment 1, the fluid 10 can be easily introduced into the microfluidic device 1 by only providing the gap 12 in the sealing pattern 5 for bonding the upper substrate 2 and the lower substrate 6. In this way, the microfluidic device 1 in accordance with Embodiment 1 can realize easy introduction of the fluid 10 into the cell of the microfluidic device 1.

Further, in the microfluidic device 1 in accordance with Embodiment 1, there is no need to provide the upper substrate 2 with a hole for introduction of the fluid 10. Accordingly, a highly-advanced technique is not required in production of the upper substrate 2. This makes it possible to keep production cost of the upper substrate 2 low. Therefore, there is no particular limitation to the number of the gap(s) 12 provided in the sealing pattern 5.

Further, the pitch, the length, etc. of the gaps 12 in the sealing pattern 5 are not particularly limited. The pitch, the length, etc. of the gaps 12 may be appropriately determined depending on the amount of the fluid 10 to be introduced, and the like.

Note that as illustrated in (a) of FIG. 2, the upper water-repellent pattern 4 is preferably provided with cutout portions 11 formed at respective positions corresponding to the gaps 12 in the sealing pattern 5. This decreases water repellency in the vicinity of the gaps 12 in the sealing pattern 5. This accordingly helps the fluid 10 to naturally enter between the upper substrate 2 and the lower substrate 6 through the gaps 12 in the sealing pattern 5 when the fluid 10 is dropped on the lower substrate 6 in the vicinity of the gaps 12 in the sealing pattern 5.

Further, as illustrated in (b) of FIG. 2, the lower water-repellent pattern 9 is preferably provided with cutout portions 13 at respective positions corresponding to the gaps 12 in the sealing pattern 5. This further decreases water repellency in the vicinity of the gaps 12 in the sealing pattern 5, and therefore can further help the fluid 10 to naturally enter between the upper substrate 2 and the lower substrate 6 through the gaps 12 in the sealing pattern 5 when the fluid 10 is dropped on the lower substrate 6 in the vicinity of the gaps 12 in the sealing pattern 5.

Even in a configuration where the cutout portions are provided in either one of the upper water-repellent pattern 4 and the lower water-repellent pattern 9, the fluid 10 can be sufficiently helped to naturally enter between the upper substrate 2 and the lower substrate 6 through the gaps 12 in the sealing pattern 5 when the fluid 10 is dropped on the lower substrate 6 in the vicinity of the gaps 12 in the sealing pattern 5. Note however that in view of further helping the fluid 10 to naturally enter between the upper substrate 2 and the lower substrate 6 through the gaps 12, it is preferable to provide the cutout portions in both of the upper water-repellent pattern 4 and the lower water-repellent pattern 9.

Note that the sealing pattern 5 may be made of a hydrophilic material so as to help the fluid 10 to naturally enter between the upper substrate 2 and the lower substrate 6 through the gaps 12 in the sealing pattern 5 at the time when the fluid 10 is dropped on the lower substrate 6 in the vicinity of the gaps 12 in the sealing pattern 5.

Further, the lower electrodes 7 may include induction electrodes as necessary, and the induction electrodes may be configured to extend to the vicinity of the gaps 12. When voltage is applied to the lower electrodes 7, the fluid 10 having entered between the upper substrate 2 and the lower substrate 6 through the gaps 12 is drawn into the cell along the induction electrodes due to the electrowetting effect.

Water-Repellent Pattern

Next, a method of forming a water-repellent pattern will be discussed with reference to FIG. 4. The following will discuss, as an example of the method of forming a water-repellent pattern, a case where the upper water-repellent pattern 4 is formed on the upper substrate 2. (a) to (h) of FIG. 4 are views illustrating respective steps of forming the upper water-repellent pattern 4 on the upper substrate 2.

First, silane coupling of the upper substrate 2 is performed with use of a silane coupling solution, so that a silane coating 15 is formed on the upper substrate 2 (see (a) of FIG. 4). Then, a water-repellent coating 4' is formed on the silane coating 15 with use of a water-repellent solution such as CYTOP (Registered Trademark) (see (b) of FIG. 4).

Next, in order to improve resist coatability, surface treatment of the water-repellent coating 4' is performed by using an etching device so as to make the water-repellent coating 4' hydrophilic (see (c) of FIG. 4). Thereafter, on the water-repellent coating 4' having been surface-treated, a resist coating 16 is formed of a resist liquid (see (d) of FIG. 4).

Next, after the resist coating 16 is exposed to light by an exposure device so as to have a predetermined pattern (see (e) of FIG. 4), development using a developing solution is performed (see (f) of FIG. 4). As a result, the resist coating 16 is patterned so as to have a predetermined pattern.

Subsequently, the water-repellent coating 4' exposed as a result of patterning of the resist coating 16 is subjected to dry-etching by use of an etching device (see (g) of FIG. 4). As a result, the water-repellent coating 4' is patterned so as to have a predetermined pattern, so that the upper water-repellent pattern 4' is formed.

Thereafter, the resist coating 16 on the upper water-repellent pattern 4 is stripped by use of a stripping solution (see (h) of FIG. 4). At the end, an annealing process is performed so as to recover the water-repellent performance of the upper water-repellent pattern 4 having been made hydrophilic in the surface treatment.

A series of the above steps makes it possible to form the upper water-repellent pattern 4 on the upper substrate 2. The lower water-repellent pattern 9 of the lower substrate 6 can be formed by similar steps.

Embodiment 2

The following will discuss Embodiment 2 of the present invention, with reference to FIGS. 5 to 7. Note that, for convenience of explanation, identical reference numerals are given to members which have respective functions identical with those described in Embodiment 1, and descriptions of the respective members are omitted.

Fluid Introduction Structure

The following will discuss a microfluidic device 1A in accordance with Embodiment 2, with reference to FIGS. 5 and 6. (a) of FIG. 5 is a top view of an upper substrate 2A and (b) of FIG. 5 is a top view of a lower substrate 6A. (a) of FIG. 6 is a partial perspective view of the microfluidic device 1A at the time when fluid 10 is introduced into the microfluidic device 1A, and (b) of FIG. 6 is a cross-sectional view taken along the line A-A' in (a) of FIG. 6.

As illustrated in (a) of FIG. 5, the upper substrate 2A of the microfluidic device 1A in accordance with Embodiment 2 is provided with a sealing pattern 5 formed on an upper water-repellent pattern 4A. The upper substrate 2A is bonded via a sealing pattern 5 to a surface of the lower substrate 6A on a lower water-repellent pattern 9A side of the lower substrate 6A.

As illustrated in (b) of FIG. 5, the lower substrate 6A of the microfluidic device 1A in accordance with Embodiment 2 is larger than the upper substrate 2A, and the upper substrate 2A is bonded to the lower substrate 6A such that the upper substrate 2A is within the surface of the lower substrate 6A (an area 18 in (b) of FIG. 5). In other words, the upper substrate 2A is bonded to the lower substrate 6A via the sealing pattern 5 such that at least a portion of an edge of the upper substrate 2A is located inward of an edge of the lower substrate 6A.

As illustrated in (a) of FIG. 5, the upper water-repellent pattern 4A is provided with a hydrophilic pattern 16 such that the hydrophilic pattern 16 is present at positions corresponding to the positions of gaps 12 in the sealing pattern 5. Further, as illustrated in (b) of FIG. 5, the lower water-repellent pattern 9A is also provided with a hydrophilic pattern 17 such that the hydrophilic pattern 17 is present at positions corresponding to the positions of gaps 12 in the sealing pattern 5.

As illustrated in (a) of FIG. 6, the fluid 10 to be introduced into the microfluidic device 1A is dropped on the lower substrate 6A in the vicinity of the gaps 12 in the sealing pattern 5. Then, the fluid 10 thus dropped naturally enters between the upper substrate 2A and the lower substrate 6A through the gaps 12 in the sealing pattern 5 due to capillary action, as illustrated in (b) of FIG. 6. When the fluid 10 enters between the above substrates, a hydrophilic property has been improved in the vicinity of the gaps 12 in the sealing pattern 5 due to the hydrophilic pattern 16 of the upper water-repellent pattern 4A and the hydrophilic pattern 17 of the lower water-repellent pattern 9A. This can help the fluid 10 to naturally enter between the upper substrate 2 and the lower substrate 6 through the gaps 12 in the sealing pattern 5 when the fluid 10 is dropped on the lower substrate 6 in the vicinity of the gaps 12 in the sealing pattern 5.

Note that even in a case where the hydrophilic pattern is formed in only one of the upper water-repellent pattern 4 and the lower water-repellent pattern 9, the fluid 10 is sufficiently helped to naturally enter between the upper substrate 2 and the lower substrate 6 through the gaps 12 in the sealing pattern 5 when the fluid 10 is dropped on the lower substrate 6 in the vicinity of the gaps 12 in the sealing pattern 5. Note however that in view of further helping the fluid 10 to naturally enter between the upper substrate 2 and the lower substrate 6 through the gaps 12, it is preferable to provide the hydrophilic pattern to both of the upper water-repellent pattern 4 and the lower water-repellent pattern 9.

Hydrophilic Pattern

Next, a method of forming a hydrophilic pattern will be discussed with reference to FIG. 7. The following will discuss, as an example of the method of forming a hydrophilic pattern, a case where the hydrophilic pattern 16 is formed in the upper water-repellent pattern 4A on the upper substrate 2A. (a) of FIG. 7 is a view illustrating a method of forming a hydrophilic pattern with use of a monomolecular hydrophilic material is used, and (b) of FIG. 7 is a view illustrating a method of forming a hydrophilic pattern with use of a polymeric hydrophilic material.

The hydrophilic patterns 16 and 17 can be formed of a hydrophilic material such as a fluorocoating agent (SF-COAT). For example, in a case where SFCOAT which is a monomolecular one is used and applied as illustrated in (a) of FIG. 7 so as to have a predetermined pattern, the upper water-repellent pattern 4A adsorbs a fluorine group 20 of SFCOAT 19A due to a high surface tension of the upper water-repellent pattern 4A on the upper substrate 2A. This causes a hydrophilic group 21A to be aligned at the outermost surface. This causes only a surface having a pattern to which SFCOAT is applied to be a hydrophilic surface.

In contrast, in a case where SFCOAT which is a polymeric one is used and applied as illustrated in (b) of FIG. 7 so as to have a predetermined pattern, the upper water-repellent pattern 4A adsorbs a fluorine group 20 of SFCOAT 19B due to the high surface tension of the upper water-repellent pattern 4A on the upper substrate 2A. This causes hydrophilic main chains 21B to be aligned at the outermost surface. This causes only a surface having a pattern to which SFCOAT is applied to be a hydrophilic surface.

Embodiment 3

The following will discuss Embodiment 3 of the present invention, with reference to FIGS. 8 and 9. Note that, for convenience of explanation, identical reference numerals are given to members which have respective functions identical with those described in Embodiment 1, and descriptions of the respective members are omitted.

Fluid Introduction Structure

The following will discuss a microfluidic device 1B in accordance with Embodiment 3, with reference to FIGS. 8 and 9. (a) of FIG. 8 is a partial top view of an upper substrate 2B and (b) of FIG. 8 is a partial top view of a lower substrate 6B. (a) of FIG. 9 is a partial perspective view of the microfluidic device 1B at the time when fluid 10 is introduced into the microfluidic device 1B, and (b) of FIG. 9 is a cross-sectional view taken along the line A-A' in (a) of FIG. 9.

As illustrated in (a) of FIG. 8, the upper substrate 2B of the microfluidic device 1B in accordance with Embodiment 3 is provided with a sealing pattern 5B formed on an upper water-repellent pattern 4B. Meanwhile, as illustrated in (b) of FIG. 8, the lower substrate 6B of the microfluidic device 1B in accordance with Embodiment 3 is also provided with a sealing pattern 22 formed on a lower upper water-repellent pattern 9B.

The upper substrate 2B is bonded via the sealing pattern 5B and the sealing pattern 22 to a surface of the lower substrate 6B on a lower water-repellent pattern 9B side of the lower substrate 6B. As illustrated in (b) of FIG. 8, the lower substrate 6B is larger than the upper substrate 2B, and the upper substrate 2B is bonded to the lower substrate 6B such that the upper substrate 2B is within the surface of the lower substrate 6B. In other words, the upper substrate 2B is bonded to the lower substrate 6B via the sealing pattern 5B and the sealing pattern 22 such that at least a portion of an edge of the upper substrate 2B is located inward of an edge of the lower substrate 6B.

As illustrated in (a) of FIG. 8, the sealing pattern 5B is shaped to include an inwardly diverted portion that extends toward an inside of the upper substrate 2B. The inwardly diverted portion is a portion of the sealing pattern 5B at a position where the edge of the upper substrate 2B is located inward of the edge of the lower substrate 6B. Further, the inwardly diverted portion includes a gap 12B. In (a) of FIG. 8, the sealing pattern 5B has a shape of an arc of a semicircle which extends toward the inside of the upper substrate 2B. Note that in (a) of FIG. 8, the sealing pattern 5B is in a dotted line form, and the gap 12B here refers to a gap whose size is larger than the pitch of dots of that dotted line.

The sealing pattern 22 is formed so as to correspond to the sealing pattern 5B. As illustrated in (b) of FIG. 8, the sealing pattern 22, like the sealing pattern 5B, is shaped to include an inwardly diverted portion that extends toward an inside of the lower substrate 6B. The inwardly diverted portion is a portion of the sealing pattern 22 at a position where the edge of the upper substrate 2B is located inward of the edge of the lower substrate 6B. Further, the inwardly diverted portion includes a gap 23. In (b) of FIG. 8, the sealing pattern 22 has a shape of an arc of a semicircle which extends toward the inside of the lower substrate 6B on the lower substrate 6B.

As illustrated in (a) of FIG. 9, the upper substrate 2B is bonded to the lower substrate 6B via the sealing pattern 5B and the sealing pattern 22, so that the sealing pattern 5B and the sealing pattern 22 adhere to each other to form one sealing pattern 22B. This sealing pattern 22B has a gap 23B formed by the gap 12B and the gap 23.

The fluid 10 to be introduced into the microfluidic device 1B is dropped on the lower substrate 6B in the vicinity of the gap 23B in the sealing pattern 22B. As illustrated in (b) of FIG. 9, the fluid 10 thus dropped naturally enters between the upper substrate 2B and the lower substrate 6B through the gap 23B in the sealing pattern 22B due to capillary action.

When the fluid 10 enters between the above substrates, the fluid 10 dropped is led to between the two substrates through the gap 23B in the sealing pattern 22B due to the shape of the inwardly diverted portion that extends toward the insides of the upper substrate 2B and the lower substrate 6B. This can help the fluid 10 to naturally enter between the two substrates through the gap 23B.

Meanwhile, the sealing patterns 5B and 22 are not limited in shape to the shapes illustrated in FIG. 8. For example, the shape of the sealing patterns 5B and 22 may be a rectangular shape which extends toward the insides of the upper substrate 2B and the lower substrate 6B.

Note that in order to help the fluid 10 to naturally enter between the upper substrate 2B and the lower substrate 6B through the gap 23B in the sealing pattern 22B when the fluid 10 is dropped on the lower substrate 6B in the vicinity of the gap 23B in the sealing pattern 22B, it is preferable that a material to be used for forming the sealing pattern 5B and the sealing pattern 22 have a higher surface tension (i.e., a higher wettability) than a material to be used for forming the upper water-repellent pattern 4B and the lower water-repellent pattern 9B. It is more preferable that the sealing pattern 5B and the sealing pattern 22 be formed of a hydrophilic material. The phrase "a higher surface tension" here means that a force to draw material surface inward is stronger.

Further, as in Embodiments 1 and 2, the fluid 10 may be further helped to enter between the above two substrates through the gap 12 by forming, in the upper water-repellent pattern 4B and the lower water-repellent pattern 9B, cutout portions at respective positions corresponding to the positions of the gaps 12B and 23 in the sealing patterns 5B and 22 and/or by forming hydrophilic patterns at the respective positions.

Embodiment 4

The following will discuss Embodiment 4 of the present invention, with reference to FIG. 10. Note that, for convenience of explanation, identical reference numerals are given to members which have respective functions identical with those described in Embodiment 1, and descriptions of the respective members are omitted.

Fluid Introduction Structure

The following will discuss a microfluidic device 1C in accordance with Embodiment 4, with reference to FIG. 10. FIG. 10 is a partial cross-sectional view of part of the microfluidic device 1C in a case where fluid 10 is introduced into the microfluidic device 1C.

As illustrated in FIG. 10, the microfluidic device 1C in accordance with Embodiment 4 is configured to include a fluid introduction component 24 for introducing the fluid 10 into the microfluidic device 1C. The other configuration of Embodiment 4 is identical to that of Embodiment 1.

The fluid introduction component 24 is attached to the upper substrate 2 and includes a fluid channel 25 extending to a gap in a sealing pattern from outside the microfluidic device 1C. In the fluid channel 25, an open end leading to the outside of the microfluidic device 1C is in the form of an inlet 26 for introducing the fluid 10. This fluid introduction component 24 is preferably made of a material having a high affinity for the fluid 10.

The fluid 10 is introduced into the microfluidic device 1C through the inlet 26 of the fluid channel 25 of the fluid introduction component 24, so that the fluid 10 reaches a surface of the lower substrate 6 in the vicinity of the gap in the sealing pattern through the fluid channel 25. The fluid 10 having reached the vicinity of the gap in the sealing pattern naturally enters between the upper substrate 2 and the lower substrate 6 through the gap in the sealing pattern due to capillary action.

In this way, in the microfluidic device 1C in accordance with Embodiment 4, it is possible to drop the fluid 10 onto the lower substrate 6 in the vicinity of the gap in the sealing pattern by only introducing the fluid 10 into the inlet 26 of the fluid introduction component 24. Accordingly, the microfluidic device 1C in accordance with Embodiment 4 makes it easy to drop the fluid 10 onto the lower substrate 6 in the vicinity of the gap in the sealing pattern.

Note that the size of the inlet 26 may be determined in accordance with an amount of the fluid 10 to be dropped. For example, the size of the inlet 26 may be arranged to be the same as the size of a pipette which is used in dropping the fluid 10 in a case where the fluid introduction component 24 is not used.

In a case where a plurality of gaps is formed in the sealing pattern, the fluid introduction component 24 may be provided for each gap, but Embodiment 4 is not limited to such a configuration. For example, the fluid channel 25 of the fluid introduction component 24 may be provided with a plurality of branch channels, each of which leads to each gap. This makes it possible to simultaneously drop the fluid 10 at a plurality of positions (in the vicinity of a plurality of gaps on the lower substrate 6) through one inlet 26. This makes it possible to easily drop the fluid 10 at predetermined positions, even in a case where the number of the positions where the fluid 10 is to be dropped is large due to a large number of gaps in the sealing pattern.

Note that the fluid introduction component 24 in accordance with Embodiment 4 is clearly applicable to Embodiments 2 and 3.

Recap

A microfluidic device 1, 1A to 1C according to Aspect 1 of the present invention is a microfluidic device 1, 1A to 1C containing fluid 10 introduced therein, the microfluidic device 1, 1A to 1C including: an upper substrate 2, 2A, 2B on which an upper water-repellent pattern 4, 4A, 4B is formed; a lower substrate 6, 6A, 6B on which a lower water-repellent pattern 9, 9A, 9B is formed; and a sealing pattern 5, 22B for bonding the upper substrate 2, 2A, 2B and the lower substrate 6, 6A, 6B such that at least a portion of an edge of the upper substrate 2, 2A, 2B is located inward of an edge of the lower substrate 6, 6A, 6B, the sealing pattern 5, 22B including at least one gap 12, 23B that is provided at a position where the edge of the upper substrate 2, 2A, 2B is located inward of the edge of the lower substrate 6, 6A, 6B.

In the above configuration, the fluid 10 to be introduced into the microfluidic device 1, 1A to 1C is dropped on the lower substrate 6, 6A, 6B in the vicinity of the gap 12, 23B in the sealing pattern 5, 22B, so that the fluid 10 thus dropped naturally enters between the upper substrate 2, 2A, 2B and the lower substrate 6, 6A, 6B through the gap 12, 23B in the sealing pattern 5, 22B due to capillary action. In this way, in the microfluidic device 1, 1A to 1C according to an aspect of the present invention, the fluid 10 can be introduced into a cell of the microfluidic device 1, 1A to 1C.

In the microfluidic device 1, 1A to 1C according to an aspect of the present invention, the fluid 10 can be easily introduced into the microfluidic device 1, 1A to 1C by only providing the gap 12, 23B in the sealing pattern 5, 22B for bonding the upper substrate 2, 2A, 2B and the lower substrate 6, 6A, 6B. In this way, the microfluidic device 1, 1A to 1C according to an aspect of the present invention can realize easy introduction of the fluid 10 into the cell of the microfluidic device 1, 1A to 1C.

A microfluidic device 1 according to Aspect 2 of the present invention may be configured such that in Aspect 1 above, the upper water-repellent pattern 4 is provided with a cutout portion 11 formed at a position corresponding to the position of the gap 12 in the sealing pattern 5.

The above configuration decreases water repellency in the vicinity of the gap 12 in the sealing pattern 5. This helps the fluid 10 to naturally enter between the upper substrate 2 and the lower substrate 6 through the gap 12 in the sealing pattern 5 when the fluid 10 is dropped on the lower substrate 6 in the vicinity of the gap 12 in the sealing pattern 5.

A microfluidic device 1 according to Aspect 3 of the present invention may be arranged such that in Aspect 1 or 2 above, the lower water-repellent pattern 9 is provided with a cutout portion 13 formed at a position corresponding to the position of the gap 12 in the sealing pattern 5.

The above configuration further decreases water repellency in the vicinity of the gap 12 in the sealing pattern 5. This helps the fluid 10 to naturally enter between the upper substrate 2 and the lower substrate 6 through the gap 12 in the sealing pattern 5 when the fluid 10 is dropped on the lower substrate 6 in the vicinity of the gap 12 in the sealing pattern 5.

A microfluidic device 1A according to Aspect 4 of the present invention may be configured such that in Aspect 1 above, the upper water-repellent pattern 4A is provided with a hydrophilic pattern 16 formed at a position corresponding to the position of the gap 12 in the sealing pattern 5.

The above configuration improves hydrophilicity in the vicinity of the gap 12 in the sealing pattern 5. This helps the fluid 10 to naturally enter between the upper substrate 2 and the lower substrate 6 through the gap 12 in the sealing pattern 5 when the fluid 10 is dropped on the lower substrate 6 in the vicinity of the gap 12 in the sealing pattern 5.

A microfluidic device 1A according to Aspect 5 of the present invention may be configured such that in Aspect 1 or 4 above, the lower water-repellent pattern 9A is provided with a hydrophilic pattern 17 formed at a position corresponding to the position of the gap 12 in the sealing pattern 5.

The above configuration further improves hydrophilicity in the vicinity of the gap 12 in the sealing pattern 5. This helps the fluid 10 to naturally enter between the upper substrate 2 and the lower substrate 6 through the gap 12 in the sealing pattern 5 when the fluid 10 is dropped on the lower substrate 6 in the vicinity of the gap 12 in the sealing pattern 5.

A microfluidic device 1B according to Aspect 6 of the present invention may be configured such that in any one of Aspects 1 through 5 above, the sealing pattern 22B is shaped to include a convex portion that extends toward an inside of the upper substrate 2B, the gap 23B being provided in the inwardly diverted at a portion of the sealing pattern.

In the above configuration, the fluid 10 dropped is led to between the upper substrate 2B and the lower substrate 6B through the gap 23B in the sealing pattern 22B due to the shape of the inwardly diverted portion that extends toward insides of the upper substrate 2B and the lower substrate 6B. This can help the fluid 10 to naturally enter between the above two substrates through the gap 23B.

A microfluidic device 1B according to Aspect 7 of the present invention may be configured such that in any one of Aspects 1 through 6 above, the sealing pattern 5B is hydrophilic.

The above configuration can help the fluid 10 to naturally enter between the upper substrate 2B and the lower substrate 6B through the gap 23B in the sealing pattern 22B when the fluid 10 is dropped on the lower substrate 6B in the vicinity of the gap 23B in the sealing pattern 22B.

A microfluidic device 1C according to Aspect 8 of the present invention may be configured to further include, in any one of Aspects 1 through 7 above, a fluid introduction component 24 including a fluid channel 25 extending to the gap 12 in the sealing pattern 5 from outside the microfluidic device 1C.

In the above configuration, it is possible to drop the fluid 10 onto the lower substrate 6 in the vicinity of the gap 12 in the sealing pattern 5 by only introducing the fluid 10 into the inlet 26 of the fluid introduction component 24. Accordingly, the microfluidic device 1C in accordance with an aspect of the present invention makes it easy to drop the fluid 10 onto the lower substrate 6 in the vicinity of the gap in the sealing pattern.

A microfluidic device 1C according to Aspect 9 of the present invention may be configured to further include, in Aspect 8 above, the sealing pattern 5 includes a plurality of gaps 12; the fluid channel 25 of the fluid introduction component 24 includes a plurality of branch channels; and the branch channels lead to the gaps 12, respectively.

The above configuration makes it possible to simultaneously drop the fluid 10 at a plurality of positions (on the lower substrate 6 in the vicinity of the plurality of gaps 12) through one inlet 26. This makes it possible to easily drop the fluid 10 at predetermined positions, even in a case where the number of the positions where the fluid 10 is to be dropped is large because of a large number of gaps 12 in the sealing pattern 5.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1, 1A to 1C Microfluidic device
2, 2A, 2B Upper substrate
3 Upper electrode
4, 4A, 4B Upper water-repellent pattern
5, 5B, 22, 22B Sealing pattern
6, 6A, 6B Lower substrate
9, 9A, 9B Lower water-repellent pattern
7 Lower electrode
8 Dielectric layer
10 Fluid
16, 17 Hydrophilic pattern
24 Fluid introduction component
25 Fluid channel
26 Inlet

The invention claimed is:

1. A microfluidic device containing fluid introduced therein, the microfluidic device comprising:
a lower substrate on which a lower water-repellent pattern is formed;
an upper substrate including a rigid layer on which an upper water-repellent pattern is formed; and
a sealing pattern for bonding the upper substrate and the lower substrate such that at least a portion of an edge of the upper substrate is located inward of an edge of the lower substrate,
the sealing pattern including at least one gap that is cut into the sealing pattern independent of the rigid layer, and the gap is provided at a position where the edge of the upper substrate is located inward of the edge of the lower substrate.

2. The microfluidic device as set forth in claim 1, wherein:
the upper water-repellent pattern is provided with a cutout portion at a position corresponding to the position of the gap in the sealing pattern.

3. The microfluidic device as set forth in claim 1, wherein:
the lower water-repellent pattern is provided with a cutout portion at a position corresponding to the position of the gap in the sealing pattern.

4. The microfluidic device as set forth in claim 1, wherein:
the upper water-repellent pattern is provided with a hydrophilic pattern at a position corresponding to the position of the gap in the sealing pattern.

5. The microfluidic device as set forth in claim 1, wherein:
the lower water-repellent pattern is provided with a hydrophilic pattern at a position corresponding to the position of the gap in the sealing pattern.

6. The microfluidic device as set forth in claim 1, wherein:
the sealing pattern is shaped to include a convex portion directed toward an inside of the upper substrate,
the gap being provided in the convex portion of the sealing pattern.

7. The microfluidic device as set forth in claim 1, wherein:
the sealing pattern is hydrophilic.

8. The microfluidic device as set forth in claim 1, further comprising:
- a fluid introduction component including a fluid channel extending to the gap in the sealing pattern from outside the microfluidic device.

9. The microfluidic device as set forth in claim 8, wherein:
the sealing pattern includes a plurality of gaps;
the fluid channel of the fluid introduction component includes a plurality of branch channels; and
the branch channels lead to the gaps, respectively.

\* \* \* \* \*